United States Patent [19]

Kerckhove et al.

[11] Patent Number: 4,866,920
[45] Date of Patent: Sep. 19, 1989

[54] UNLOADING AUGER POSITION SWITCH

[75] Inventors: Dennis A. Kerckhove, East Moline; Duane H. Ziegler, Colona, both of Ill.

[73] Assignee: Deere & Company, Moline, Ill.

[21] Appl. No.: 326,412

[22] Filed: Mar. 17, 1989

Related U.S. Application Data

[63] Continuation of Ser. No. 67,760, Jun. 29, 1987, abandoned.

[51] Int. Cl.$^4$ .................. A01F 12/46; A01F 12/60
[52] U.S. Cl. ...................................... 56/16.6; 414/523
[58] Field of Search .......................... 56/16.6; 414/523

[56] References Cited

U.S. PATENT DOCUMENTS 3,834,564  9/1974  Laurent et al. .................. 414/523
4,332,261  6/1982  Webster .............................. 56/16.6

Primary Examiner—John Weiss

[57] ABSTRACT

An unloader position control switch assembly is positioned along the pivot axis of an unloader tube and is provided with a downwardly depending key that engages a slot formed in a pivot pin fixedly secured to the unloader tube. The switch assembly has two switch elements that are mechanically interconnected and are automatically resettable after the unloading tube substantially reaches either the storage position or the unloading position for the unloading tube. An operator's switch is interconnected with the control switch assembly so that an operator may easily manipulate the positioning of the unloader tube.

15 Claims, 4 Drawing Sheets

UNLOADING AUGER POSITION SWITCH

This application is a continuation of application Ser. No. 07/067,760, filed June 29, 1987 abandoned 5/1/89.

BACKGROUND OF THE INVENTION

1. Field of the Invention

The present invention is directed to a control system for positioning an unloader auger tube. The control system comprises an electrical position switch which shuts down the hydraulic positioning means when the unloading auger is substantially in a storage position or an unloading position.

2. Background of the Invention

Typically, a self-propelled agricultural combine gathers a crop from a field and transports the crop by means of a feeder house to threshing and separating means located inside the combine. The threshing and separating means separates the grain from the straw and chaff. The straw and chaff are expelled out of the rear of the combine while the clean grain is transported and stored in a clean grain compartment located on the combine.

As the clean grain compartment becomes full, it must be unloaded into a receiving truck. The clean grain compartment is provided with an unloading auger assembly and a pivotally mounted unloading tube that is extended outwardly away from a storage position at the side of the combine to an unloading position during an unloading operation. Many times, the operator drives the combine to the receiving truck to unload, but in some instances, the operator may unload while continuing harvesting operations. Unloading under operation involves driving the receiving truck on a parallel track to the combine and having the combine operator swing out an unloading tube so that grain is expelled into the truck. This can be a difficult operation for the combine operator, in that he must monitor and direct the harvesting, threshing and separating operations while also monitoring the positioning of the unloading tube.

SUMMARY OF THE INVENTION

The present invention simplifies positioning of the unloading tube by providing an electric unloading position control switch assembly that detects the position of the unloading tube when it is in an extended unloading position or a retracted storage position. The control switch assembly is provided with two switch elements which are mechanically interconnected so that as one element is opened the other element is closed. In this way, the control switch assembly is resetable in that as the unloading tube substantially reaches the unloading position the switch elements reset so that the open switch element closes and the closed switch element opens. Conversely, if the unloading tube substantially reaches the storage position, the switch elements again reset.

The unloading tube is positioned by a positioning means comprising a linear hydraulic actuator that is fluidically coupled to a source of pressurized hydraulic fluid. A solenoid controlled four-way three-position directional control valve is positioned in the hydraulic circuit for controlling the movement of the unloader tube. The positioning solenoids are electrically coupled to the control switch assembly and a two-position electrical operator's switch. The positioning solenoids are energized if the operator's switch is closed in the unloading position and the unloading switch element of the control switch assembly is closed; or the operator's switch is closed in the storage position and the storage switch element of the control switch assembly is closed. Therefore, as the control switch assembly resets when the unloading tube has substantially reached the specified position, the positioning means is shut off because the corresponding switch element is now opened.

The detection means of the control switch assembly comprises a key that extends into a slot formed in a pivot pin fixedly coupled to the unloading tube. Therefore, by fixedly mounting the switch to the chassis, the slot in the pivot pin moves as the unloading tube is moved thereby turning the key of the control switch assembly.

DETAILED DESCRIPTION

Figure 1:
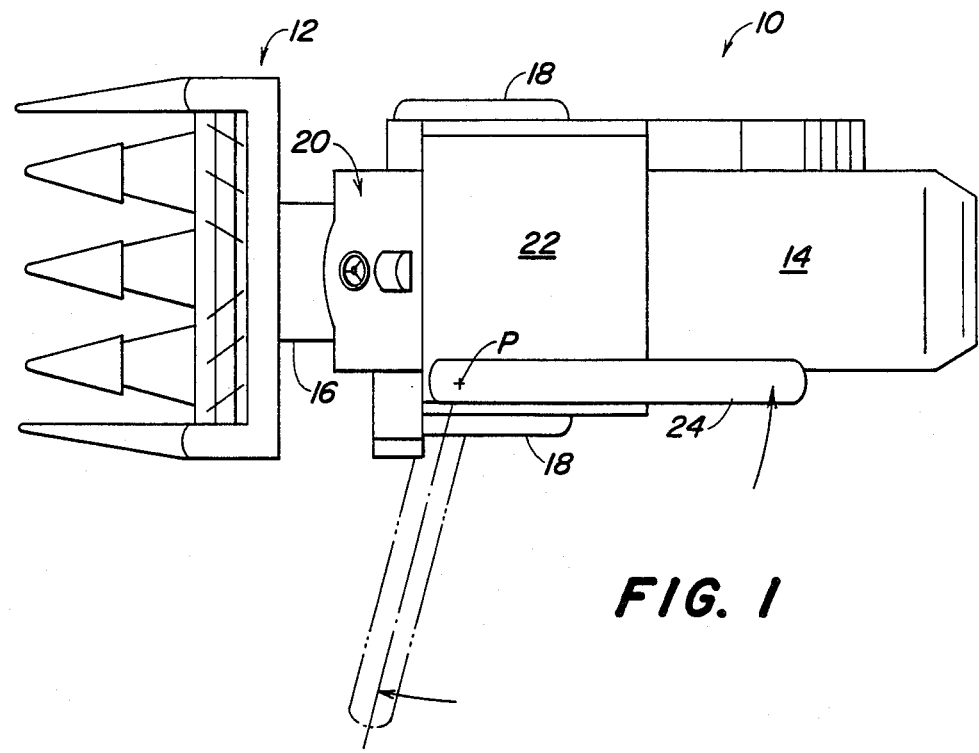
FIG. 1 is a top view of an agricultural combine.

A self-propelled agricultural combine 10, such as illustrated in FIG. 1, comprises harvesting platform 12 which is coupled to chassis 14 of the combine by feeder house 16. The chassis is provided with ground engaging wheels 18 and operator control station 20. Crops harvested by platform 12 are directed to the combine by feeder house 16. Inside the combine, the crop is threshed and separated so that the straw and chaff are expelled out of the rear of the combine and the clean grain is stored in clean grain compartment 22. To unload the harvested and separated grain from compartment 22, the combine is provided with an unloading auger housed in unloading tube 24. The auger forces grain through the tube and into a receiving truck.

The unloading tube, when not unloading grain, is located in a storage position alongside the combine, as illustrated in FIG. 1. For unloading, the tube is extended one hundred five degrees to the position indicated in phantom lines in FIG. 1. The unloading tube is pivotally coupled to the chassis of the combine at pivot axis P. Rotating the unloading tube so that it extends forward of the pivot axis facilitates monitoring of the unloading operation by the combine operator.

Figure 2:
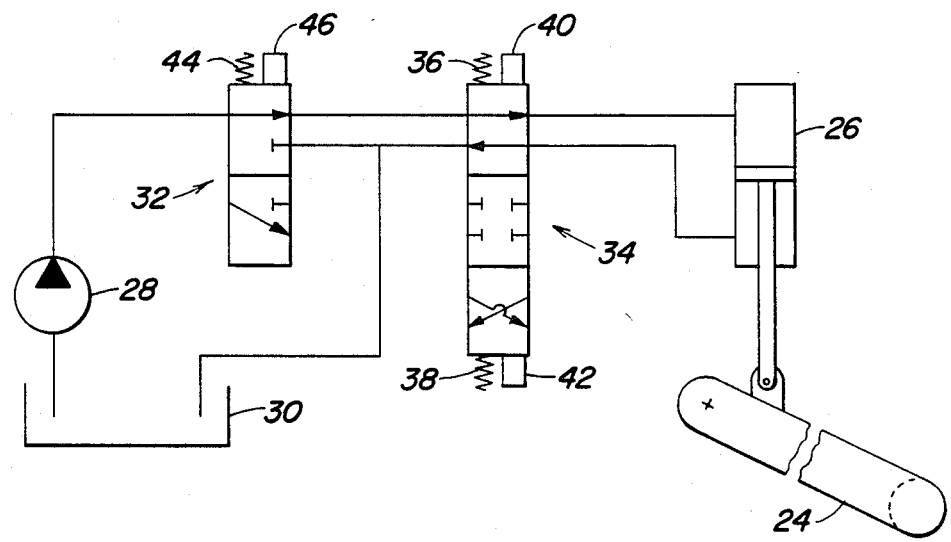
FIG. 2 is a hydraulic schematic of the positioning means of the unloading tube.

The unloading auger is moved by a hydraulic positioning means schematically illustrated in FIG. 2. The positioning means comprises a linear hydraulic actuator consisting of double acting hydraulic cylinder 26 which is fluidically coupled to a source of pressurized hydraulic fluid 28 and hydraulic fluid sump 30. Two-position hydraulic valve 32 and four-way three-position hydraulic valve 34 are fluidically positioned between the hydraulic cylinder and the hydraulic fluid pump. Valve 34 is a closed center directional control valve which is spring biassed by springs 36 and 38 into the center position. First and second solenoids 40 and 42 respectively, are used to overcome the biassing force of the spring and correctly position the valve. When first solenoid 40 is energized, as illustrated in FIG. 2, the directional control valve is in its extended position, that is hydraulic fluid is directed to cylinder 26 for extending the unloading tube away from the combine. Whereas, if second solenoid 42 is energized the valve would be moved upwardly into its retracting position, that is, where the hydraulic flow would be reversed to cylinder 26 and the unloading tube retracted.

Valve 32 is biassed by spring 44 into a position where the output of pump 28 is directly coupled to sump 30. Such a valve is necessary when pump 28 is an open center pump, and directional control valve 34 is a closed center valve. This valve is provided with third solenoid 46 which, when energized overcomes the biasing force of spring 44 and positions the valve so that hydraulic fluid from sump 28 is directed to valve 34.

Figure 3:
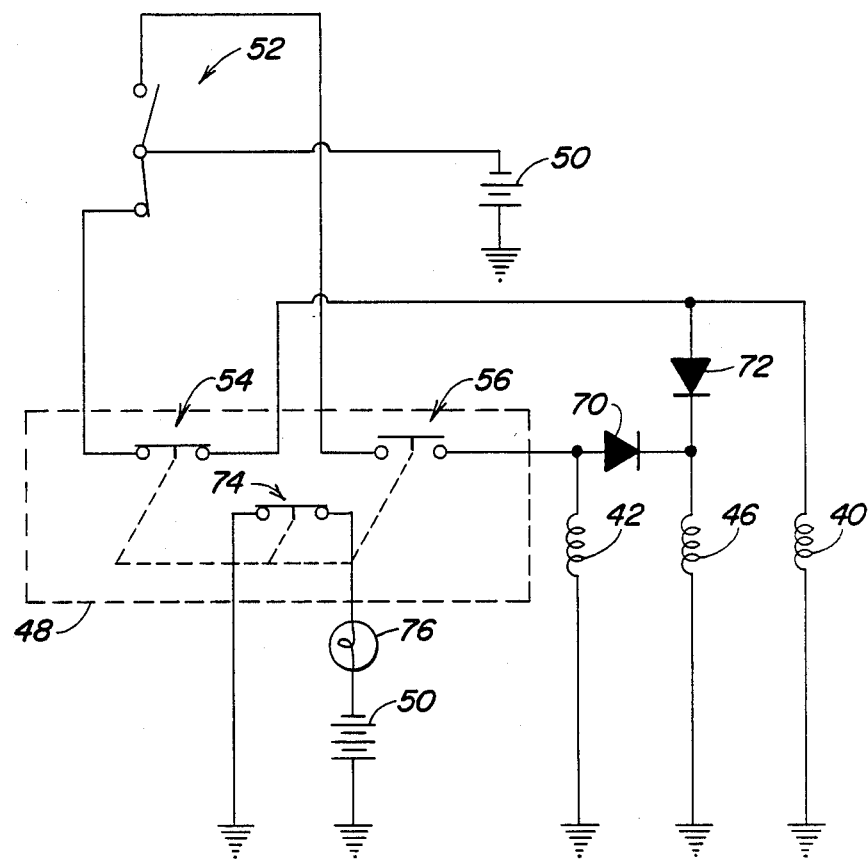
FIG. 3 is an electrical schematic of the control system for the positioning means of the unloading tube.

FIG. 3 schematically illustrates the electrical control system of the present invention. Unloader positioning control switch assembly 48 is electrically coupled to battery 50 by a latching two-position operator's switch 52. The control switch assembly is provided with first and second switch elements 54 and 56 respectively, which are mechanically interconnected so that if one element is opened, the other is closed and vice versa.

Figure 4:
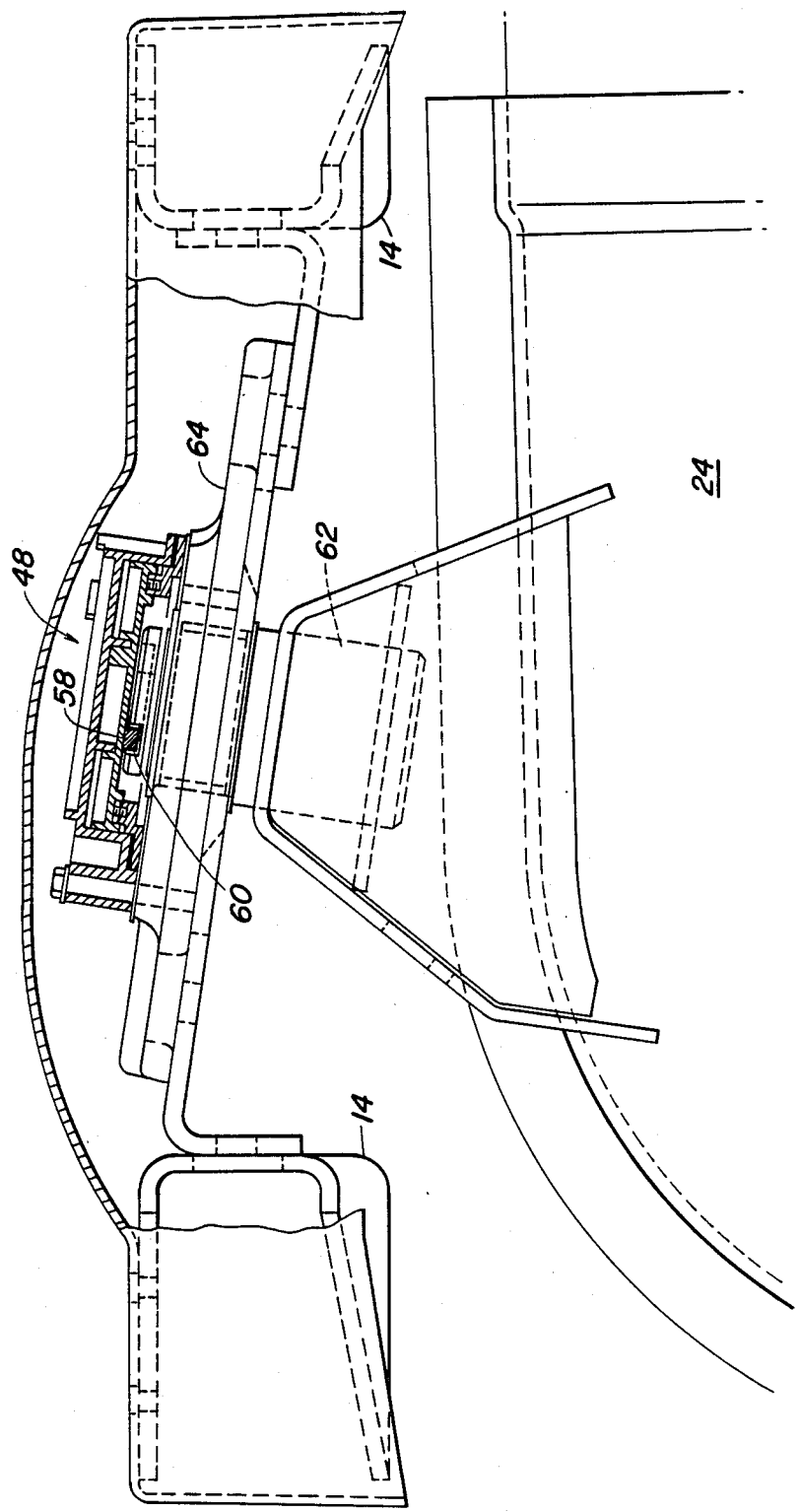
FIG. 4 is a cross sectional view of the control switch assembly.
Figure 5:
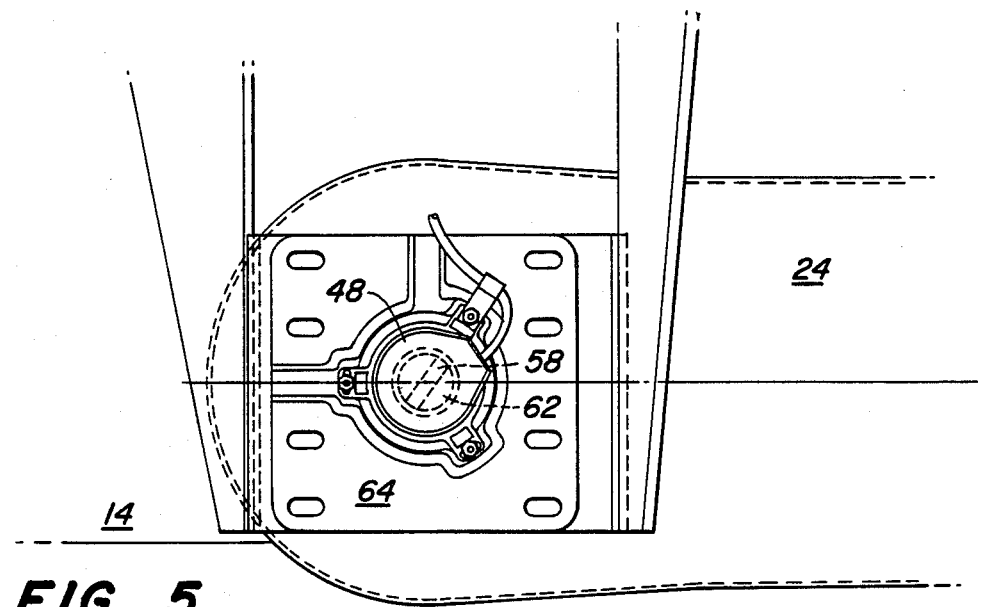
FIG. 5 is a top view of the control switch assembly when the unloading tube is in its storage position.
Figure 6:
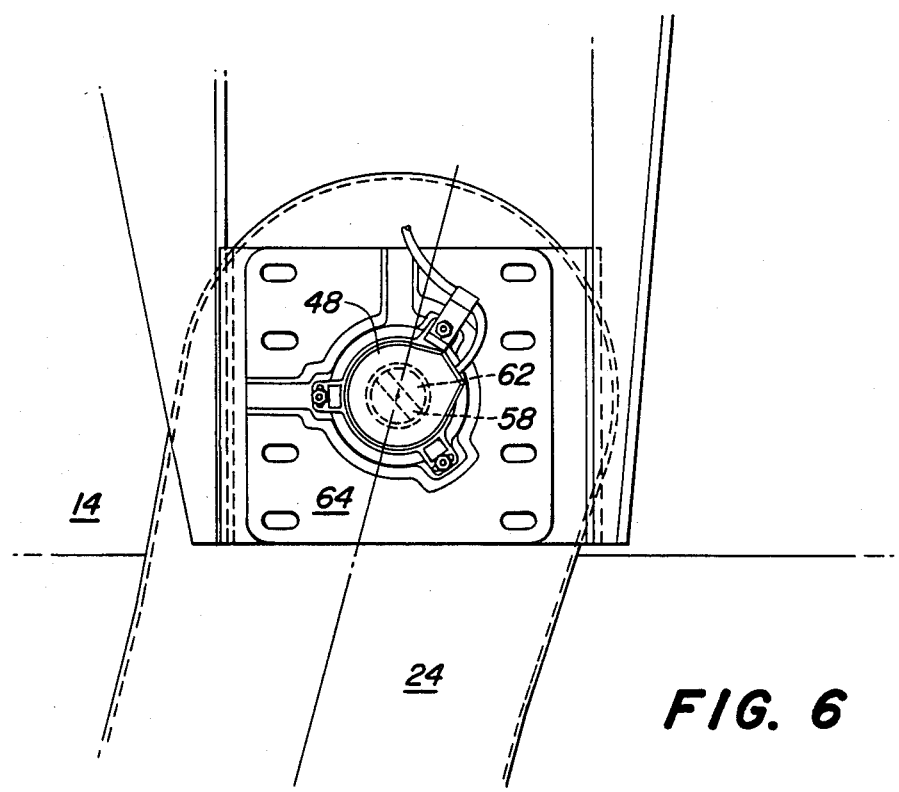
FIG. 6 is a top view of the control switch assembly when the unloading tube is in its extended unloading position.

Control switch assembly 48 is provided with an unloader position detecting means comprising a downwardly depending key 58 (better illustrated in FIGS. 4–6) is positioned in slot 60 formed in pivot pin 62 of unloader tube 24. The pivot pin is fixedly mounted to the top of the unloader tube and rotates inside an aperture in mounting bracket 64 which is fixedly mounted to the chassis of the combine. The control switch assembly is positioned axially along the pivot axis P of the unloader tube. As the unloader tube is pivoted around pivot axis P, slot 60 turns rotating key 58.

In operation, when the unloading tube substantially reaches the storage position from its extended position, first switch element 54 is closed and second switch element 56 is opened by rotating key 58. When the unloading tube substantially reaches its unloading position from its storage position, first switch element 54 is opened and second switch element closed thereby resetting the control switch assembly.

The operator manipulates the position of the unloader tube by positioning operator's switch 52. For example, as illustrated in FIG. 3, when the operator's switch is in the unloading position and first switch element 54 is closed electricity is directed to first solenoid 40 and third solenoid 46, positioning direction control valve 34 into an unloading position and the valve 32 into an open position, as illustrated in FIG. 2. When the unloading tube substantially reaches its unloading position, first switch element is opened by rotating key 58 deenergizing solenoids 40 and 46, thereby closing directional valve 34 and positioning valve 32 so that hydraulic fluid from pump 28 is directed to sump 30. To retract the unloading tube, the operator reverses operator's switch 52 which energizes second solenoid 42 and third solenoid 46.

Diodes 70 and 72 are used for isolating the energization of the first and second solenoids from the energization of the third solenoid for controlling valve 32.

Control switch assembly 48 is provided with a third switch element 74 which is used to light indicator light 76 located in the operator's cab. Switch element 74 is mechanically interconnected with the first and second switch elements and operates in unison with the first switch element. In this way, an operator is alerted to the fact that the unloading tube is extending and that the tube is fully extended into the unloading position when the light is switched off.

The present invention should not be limited to the abovedescribed embodiments, but should be limited solely to the claims that follow:

We claim:

1. A self-propelled agricultural combine for harvesting a crop from a field, and processing the crop to separate grain from straw and chaff, the combine comprising:
   a chassis;
   a propulsion means mounted on the chassis;
   ground engaging means for supporting the chassis from the ground and propelling the chassis across a field when the ground engaging means is rotated by the propulsion means;
   harvesting means extending outwardly from the chassis for harvesting a crop from a field;
   threshing and separating means located in the chassis for separating grain from straw and chaff of the harvested crop;
   a clean grain compartment mounted on the chassis, the clean grain compartment receives the grain separated from the straw and chaff by the threshing and separating means;
   an unloading tube pivotally mounted to the chassis so that the unloading tube can pivot about a pivot axis defined by a pivot pin fixedly mounted to the unloading tube, the unloading tube can be pivoted from a substantially longitudinally aligned storage position with the chassis, to an unloading position where it extends outwardly from the combine for loading clean grain into a receiving truck;
   positioning means for positioning the unloading tube from the storage position to the unloading position, and conversely from the unloading position to the storage position;
   a conveying means is used to remove grain from the clean grain compartment and direct it to the unloading tube; and
   an unloader positioning control switch for controlling the positioning means of the unloading tube, the control switch is fixedly mounted to the chassis substantially axially with the pivot axis and is provided with a means for detecting the position of the unloading tube and in response to detecting the unloading tube in either the storage or unloading position the control switch deactivates the positioning means, the means for detecting the position of the unloader tube comprises a key depending from the control switch which engages a slot formed in the pivot pin.

2. An agricultural combine as defined by claim 1 further comprising a two-position operator switch having a first position for activating the positioning means to move the unloader tube from the storage position to the unloading position and a second position for activating the positioning means to move the unloader tube from the unloading position to the storage position.

3. An agricultural combine as defined by claim 2 wherein the positioning means comprises a linear hydraulic actuator which is coupled to a pump and a associated hydraulic fluid sump, valving means are provided for controlling the routing of pressurized fluid to the actuator, the valving means being operatively coupled to the operator switch.

4. An agricultural combine as defined by claim 3 wherein the valving means comprises a three-position closed center directional control valve for controlling the hydraulic fluid flow to the linear hydraulic actuator, the three-position valve having an expanding position, a retracting position and a checked position.

5. An agricultural combine as defined by claim 4 wherein the valving means is further provided with a two-position valve located fluidically between the three-position valve and the pump, the two-position valve fluidically couples the pump directly to the sump when the three-position valve is in a checked position.

6. An agricultural combine as defined by claim 5 wherein the three-position valve is provided with a first and second positioning solenoids and the two-position valve is provided with a third positioning solenoid.

7. An agricultural combine as defined by claim 6 wherein the control switch is an electric switch assembly, the control switch is provided with a first switch element and a second switch element, one of the switch elements is closed when the other is opened, when the first switch element is closed and the second switch element opened electricity from a source of electrical energy is coupled to the first and third solenoids thereby opening the two-position valve so that hydraulic fluid from the pump is directed to the three-position valve which is moved to its retracting position so that the positioning means moves the unloading tube from the unloading position to the storage position.

8. An agricultural combine as defined by claim 7 wherein when the unloading tube substantially reaches the unloading position or the storage position, the control switch resets, that is when the unloading tube substantially reaches the unloading position from the storage position, the key contacting the slotted pivot pin opens the first switch element and closes the second switch element, conversely when the unloading auger substantially reaches the storage position, the key contacting the slotted pivot pin closes the first switch element and opens the second switch element.

9. An agricultural combine as defined by claim 8 wherein the operator switch is a two-position latching electrical switch having an expand position and a retract position, the operator switch is electrically positioned between the source of electrical energy and the control switch, an operator manipulates the operator switch to move the unloading tube in and out, however, the operator switch becomes locked-out when the control switch is reset by the unloading tube substantially approaching the unloading position or the storage position.

10. An agricultural combine as defined by claim 9 wherein the control switch is provided with a third switch element which is closed when the unloading tube is substantially in its unloading position, the third switch element when closed, activates an indicator light alerting the operator that the unloading tube is in the unloading position.

11. A self-propelled agricultural combine for harvesting a crop from a field, and processing the crop to separate grain from straw and chaff, the combine comprising:
 a chassis;
 a propulsion means mounted on the chassis;
 ground engaging means for supporting the chassis from the ground and propelling the chassis across a field when the ground engaging means is rotated by the propulsion means;
 harvesting means extending outwardly from the chassis for harvesting a crop from a field;
 threshing and separating means located in the chassis for separating grain from straw and chaff of the harvested crop;
 a clean grain compartment mounted on the chassis, the clean grain compartment receives the grain separated from the straw and chaff by the threshing and separating means;
 an unloading tube pivotally mounted to the chassis so that the unloading tube can pivot about a pivot axis, the unloading tube can be pivoted from a substantially longitudinally aligned storage position with the chassis, to an unloading position where it extends outwardly from the combine for loading clean grain into a receiving truck;
 positioning means for positioning the unloading tube from the storage position to the unloading position, and conversely from the unloading position to the storage position;
 a conveying means is used to remove grain from the clean grain compartment and direct it to the unloading tube; and
 an unloader positioning control system for controlling the positioning means of the unloading tube, the control system having an unloader position electric control switch which is provided with a means for detecting the position of the unloading tube and in response to detecting the tube in substantially either the storage or unloading position, the control switch deactivates the positioning means, the system also having a two-position electric operator switch having a first position for activating the positioning means to move the unloader tube from the storage position to the unloading position and a second position for activating the positioning means to move the unloader tube from the unloading position to the storage position.

12. An agricultural combine as defined by claim 11 wherein the control switch assembly is provided with a first switch element and a second switch element, one of the switch elements is closed when the other is opened, when the first switch element is closed and the second switch element opened, electricity from a source of electrical energy is coupled to the positioning means for moving the unloading tube from the storage position to the unloading position, conversely when the first switch element is opened and the second switch element is closed, electricity from a source of electrical energy is coupled to the positioning means for moving the unloading tube from the unloading position to the storage position.

13. An agricultural combine as defined by claim 12 wherein the unloading tube substantially reaches the unloading position or the storage position, the control switch resets, that is when the unloading tube substantially reaches the unloading position from the storage position, the key contacting the slotted pivot pin opens the first switch element and closes the second switch element, conversely when the unloading auger substantially reaches the storage position, the key contacting the slotted pivot pin closes the first switch element and opens the second switch element.

14. An agricultural combine as defined by claim 13 wherein the operator switch is a two-position latching electrical switch having an expand position and a retract position, the operator switch is electrically positioned between the source of electrical energy and the control switch, an operator manipulates the operator switch to move the unloading tube in and out, however, this switch becomes locked-out when the control switch is reset by the unloading tube substantially approaching the unloading position or the storage position.

15. An agricultural combine as defined by claim 14 wherein the control switch is provided with a third switch element which is closed when the unloading tube is substantially in its unloading position, this switch when closed activates an indicator light alerting the operator that the unloading tube is in the unloading position.

* * * * *